(12) United States Patent
Balakrishnan et al.

(10) Patent No.: US 11,190,501 B2
(45) Date of Patent: Nov. 30, 2021

(54) HYBRID SINGLE SIGN-ON FOR SOFTWARE APPLICATIONS AND SERVICES USING CLASSIC AND MODERN IDENTITY PROVIDERS

(71) Applicant: Terawe Corporation, Bellevue, WA (US)

(72) Inventors: Anilkumar Balakrishnan, Bellevue, WA (US); Ashutosh Badwe, Bellevue, WA (US); Hilal Al-Hilali, Bellevue, WA (US); Ramakrishnan Peruvemba, Bellevue, WA (US); David K. Downing, Bellevue, WA (US); Javier Dalzell, Bellevue, WA (US)

(73) Assignee: Terawe Corporation, Bellevue, WA (US)

( * ) Notice: Subject to any disclaimer, the term of this patent is extended or adjusted under 35 U.S.C. 154(b) by 152 days.

(21) Appl. No.: 16/109,466

(22) Filed: Aug. 22, 2018

(65) Prior Publication Data

US 2019/0068578 A1    Feb. 28, 2019

Related U.S. Application Data

(60) Provisional application No. 62/548,840, filed on Aug. 22, 2017.

(51) Int. Cl.
*H04L 29/06* (2006.01)
*H04L 29/08* (2006.01)
*G06F 9/451* (2018.01)

(52) U.S. Cl.
CPC ........ *H04L 63/0815* (2013.01); *H04L 63/083* (2013.01); *H04L 63/0807* (2013.01);
(Continued)

(58) Field of Classification Search
CPC . H04L 63/0815; H04L 63/0838; H04L 67/02; H04L 63/102; H04L 63/0807; H04L 63/083; G06F 9/452
See application file for complete search history.

(56) References Cited

U.S. PATENT DOCUMENTS 9,734,321 B2 *   8/2017   Ahmed ............... H04L 63/0815
9,736,153 B2 *   8/2017   McDaniel ........... H04L 63/0884
(Continued)

OTHER PUBLICATIONS

International Search Report and Written Opinion dated Oct. 18, 2018, issued in corresponding International Application No. PCT/US2018/047590, filed Aug. 22, 2018, 11 pages.

*Primary Examiner* — Abu S Sholeman
(74) *Attorney, Agent, or Firm* — Christensen O'Connor Johnson Kindness PLLC

(57) ABSTRACT

An authentication management system receives a resource request directed to a software service, which may require password-based authentication. The system redirects the resource request to an authentication identity provider (IdP), and receives an authentication token generated by the authentication IdP. The redirecting of the resource request comprises transmission of an authentication request, which includes user identity information that can be authenticated by the IdP but does not include a password for the software service. In response to receiving the authentication token, the system causes a shadow account to be created with the software service. For password-based authentication, this may include setting a temporary, random password for the shadow account. The system is then able to generate authenticated connection information (e.g., an authentication cookie) for the software service and transmit it to a client device, which enables the client device to access the software service via an authenticated connection.

9 Claims, 6 Drawing Sheets

(52) U.S. Cl.
CPC ........ *H04L 63/0838* (2013.01); *H04L 63/102* (2013.01); *H04L 67/02* (2013.01); *G06F 9/452* (2018.02)

(56) References Cited

U.S. PATENT DOCUMENTS

| | | | |
|---|---|---|---|
| 9,853,968 B2* | 12/2017 | Shen | G06F 21/45 |
| 10,404,687 B2* | 9/2019 | Malkapuram | H04L 67/141 |
| 10,986,082 B2* | 4/2021 | Singleton, IV | H04L 63/126 |
| 2006/0080545 A1* | 4/2006 | Bagley | H04L 63/083 |
| | | | 713/183 |
| 2006/0123234 A1 | 6/2006 | Schmidt et al. | |
| 2007/0260738 A1 | 11/2007 | Palekar et al. | |
| 2009/0328178 A1* | 12/2009 | McDaniel | H04L 63/0884 |
| | | | 726/9 |
| 2013/0239204 A1 | 9/2013 | Das et al. | |
| 2013/0332982 A1* | 12/2013 | Rao | H04L 63/0892 |
| | | | 726/1 |
| 2014/0337954 A1* | 11/2014 | Ahmed | H04L 63/0815 |
| | | | 726/8 |
| 2015/0172277 A1 | 6/2015 | Hoggan et al. | |
| 2015/0180948 A1* | 6/2015 | Shao | H04L 67/20 |
| | | | 709/203 |
| 2015/0304847 A1 | 10/2015 | Gong et al. | |
| 2016/0021097 A1 | 1/2016 | Shrotri | |
| 2016/0134619 A1* | 5/2016 | Mikheev | H04L 67/10 |
| | | | 726/8 |
| 2016/0219060 A1 | 7/2016 | Karunakaran et al. | |
| 2018/0234464 A1* | 8/2018 | Sim | H04L 9/3213 |
| 2018/0293399 A1* | 10/2018 | Chan | H04L 63/101 |

* cited by examiner

HYBRID SINGLE SIGN-ON FOR SOFTWARE APPLICATIONS AND SERVICES USING CLASSIC AND MODERN IDENTITY PROVIDERS

CROSS-REFERENCE(S) TO RELATED APPLICATION(S)

This application claims the benefit of U.S. Provisional Application No. 62/548,840, filed on Aug. 22, 2017, which is incorporated herein by reference.

BACKGROUND

Modern authentication and single sign-on functionality have provided many benefits for users of software in terms of convenience, efficiency, and security. However, these benefits have been difficult to extend to legacy software that was not designed with these approaches in mind. In a typical scenario where modern authentication is desired for a service that requires password-based authentication, the service itself must be redesigned, resulting in additional time, expense, and complexity for software developers. As an alternative, tools such as password managers can be used to reduce the number of passwords that a user needs to remember to access services that require password-based authentication. Password managers use a master password to store and protect other passwords. However, password managers are undesirable for several reasons. First, password managers require the user to remember a password for the password manager itself. This can be inconvenient for users. Second, the password manager must store other passwords and keep them up to date. This can be inefficient in terms of how the computer system functions, as an entirely separate set of communications and storage must be used to store and retrieve the necessary passwords for particular accounts. Furthermore, storing passwords in a central location can expose additional security risks. In the event that the master password is discovered, all passwords within the password manager are at risk of theft.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a computer system implements an authentication management system that performs a method comprising: receiving a resource request from a client computing device (e.g., via a web application), wherein the resource request is directed to a software service (e.g., a remote desktop service) that uses password-based authentication; redirecting the resource request to an authentication identity provider (IdP), wherein the redirecting of the resource request comprises transmission of an authentication request that includes user identity information (e.g., a unique identifier previously registered with the authentication IdP) along with other trusted information that allows the user's identity to be authenticated, but does not include a password for the software service; in response to the authentication request, receiving an authentication token generated by the authentication identity provider; in response to receiving the authentication token, creating a temporary shadow account with the software service that uses password-based authentication; in response to creating the shadow account, generating authenticated connection information (e.g., an authentication cookie and/or a configuration file associated with the software service); and transmitting the authenticated connection information to the client computing device (e.g., via a web application). The authenticated connection information enables the client computing device to access the software service via an authenticated connection. The creation of the shadow account may include creating a new account with the software service and setting a password for the new account. In an embodiment, the resource request is transmitted from the client computing device via a web browser, and the authentication connection information is received at the client computing device via the web browser.

In an embodiment, the step of redirecting the resource request to the authentication identity provider causes the authentication identity provider to validate the user identity information; generate the authentication token if the validation of the user identity information is successful; and transmit the authentication token to the authentication management system directly, or indirectly via the client computing device. In an embodiment, the method further includes setting a password for the shadow account at a resource identity provider (e.g., an active directory) associated with the software service; authenticating the shadow account at the resource identity provider; and if authentication of the shadow account is successful, receiving an additional authentication token from the resource identity provider.

In another aspect, the method can be performed to enable access to other software services that do not require password based-authentication. In such cases, a shadow account may be created without generating a password.

Embodiments of a computer system that provides authentication management services and performs the methods described above are also described.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In embodiments described herein, an authentication management system provides the ability to enhance legacy software employing non-modern authentication techniques, such as password-based authentication, with modern authentication or single sign-on functionality using identity providers.

In an embodiment, an authentication management system receives a resource request directed to a software service, which may require password-based authentication. The system redirects the resource request to an authentication identity provider (IdP), and receives an authentication token generated by the authentication IdP. The redirecting of the resource request comprises transmission of an authentication request to the authentication IdP. The authentication request includes user identity information (e.g., a unique identifier previously registered with the authentication IdP) along with other trusted information (e.g., one-time password, digital certificate, etc.) that allows the user's identity to be authenticated by the IdP, but does not include a password for the software service to which the resource request is directed. In response to receiving the authentication token, the system causes a temporary shadow account to be created with the software service. For software services that require password-based authentication, this may include setting a temporary, random password for the shadow account. The system is then able to generate authenticated connection information (e.g., an authentication cookie) for the software service and transmit it to a client device, which enables the client device to access the software service via an authenticated connection, all without storing any passwords for the software service.

Previously, software would need to be redesigned to take advantage of such functionality, or other intrusive or inconvenient tools, such as password managers, would be required. Compared with prior systems such as password managers, embodiments described herein provide several advantages. Disclosed embodiments eliminate the need to remember any passwords or employ a password manager, and do not require storage of passwords. Described embodiments also provide a blended technological approach that permits modern authentication to be used without modifying the underlying authentication functionality of a password-based service.

An illustrative environment in which described embodiments may be introduced is now described with reference to FIG. 1.

Figure 1:
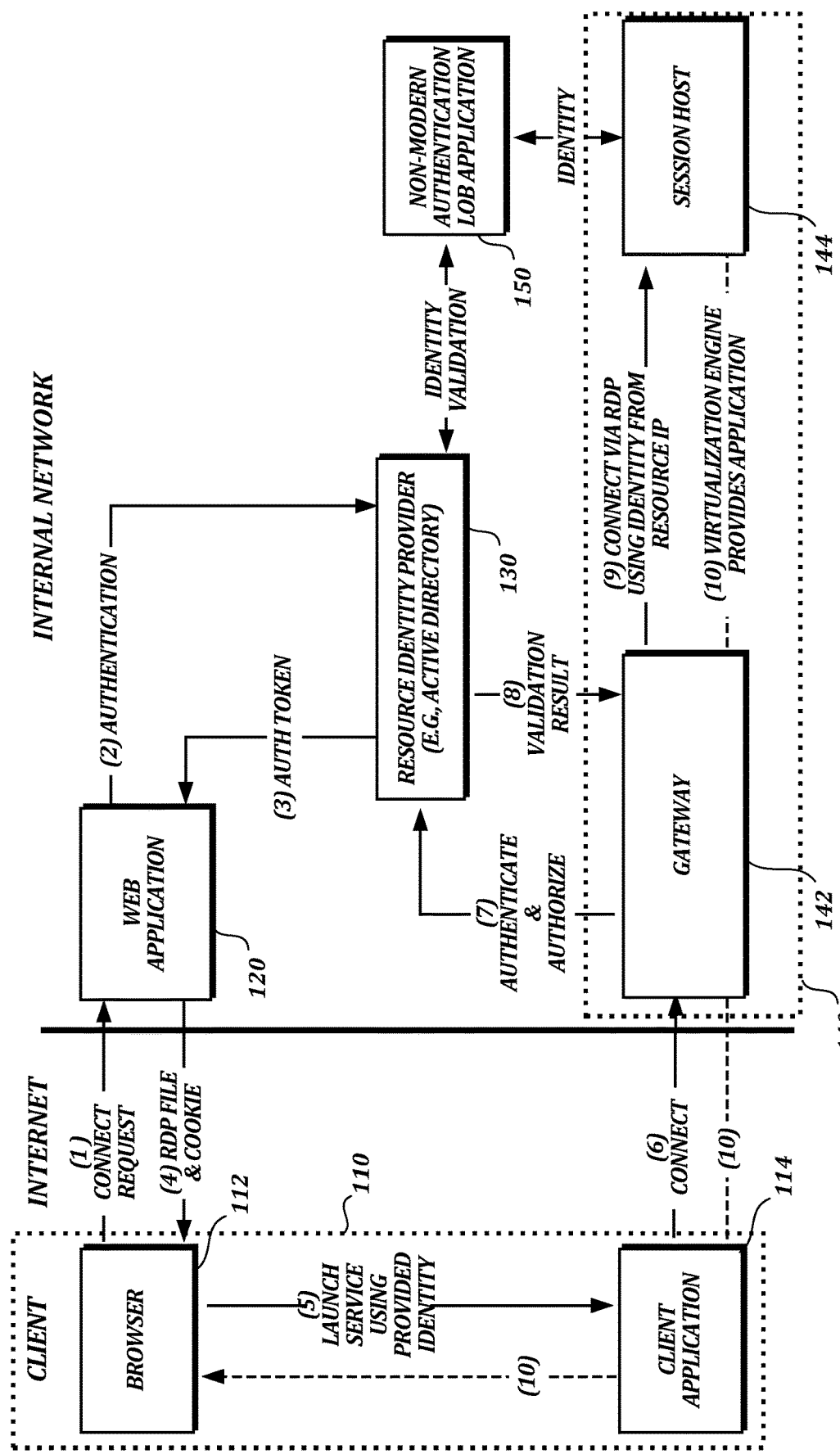
FIG. 1 is a system diagram depicting system components and process steps that may be used to establish an authenticated connection between a client computing device and a software service that requires password-based authentication.

FIG. 1 is a system diagram depicting system components and process steps that may be used to establish an authenticated connection between a client computing device and a software service that requires password-based authentication. Referring to FIG. 1, a client computing device 110 executes a browser 112 and a client application 114 that allows the client computing device to connect to a software service 140. The client application 114 is configured to provide the client computing device 110 with an authenticated connection to the software service 140, if the necessary authentication credentials can be provided and verified. A web application 120 provides an authentication interface between the client computing device 110 and the software service 140. In a typical scenario, a user navigates to a web application 120 using the browser 112, which transmits a resource request to the web application (step 1). The client computing device 110 provides user credentials (e.g., username and password), which the web application 120 transmits to a resource identity provider (IdP) 130 in an authentication request (step 2). The resource IdP authenticates the user and returns an authentication token to the web application 120 (step 3). The web application 120 then generates and provides authenticated connection information to the client computing device via the browser 112 (step 4). The authenticated connection information may be provided in the form of, e.g., an authentication cookie, a configuration file, etc. The client application 114 obtains the authenticated connection information from the browser 112 (step 5) and transmits the authenticated connection information to the software service 140 (step 6), which permits the client computing device 110 to access the software service 140 via an authenticated connection. The software service 140 transmits the authenticated connection information to the resource IdP 130 (authentication and authorization—step 7) and receives a validation result (step 8). The authenticated connection is then established between the client computing device 110 and the software service 140 (step 10).

The software service 140 may include subcomponents such as a gateway 142 and a session host 144. In such an arrangement, the software service 140 may use the gateway 142 to receive the authenticated connection information from the client application 114 and handle communication with the resource IdP 130. If the authentication is successful, the gateway 142 connects to the session host 144 using information obtained from the resource IdP 130 (step 9), which provides application functionality for the client computing device 110 via the authenticated connection (step 10). In an illustrative scenario, the software service 140 is a Remote Desktop service (RDS) and the resource IdP 130 is an Active Directory (AD) service, both available from Microsoft Corporation. In this scenario, the authenticated connection information may be provided in the form of a cookie and an .rdp (Remote Desktop configuration) file. The RDS includes a Remote Desktop Gateway and Remote Desktop Session Host (RDSH). The RDSH may be used to access other applications, such as a line-of-business (LOB) application 150 that also uses non-modern (e.g., password-based) authentication. The client application 114 may be, for example, a Remote Desktop Connection (RDC) client or Terminal Services client (MSTSC) configured to provide the client computing device 110 with an authenticated connection to the RDS.

An embodiment of the present disclosure is now described with reference to FIGS. 2 and 3.

Figure 2:
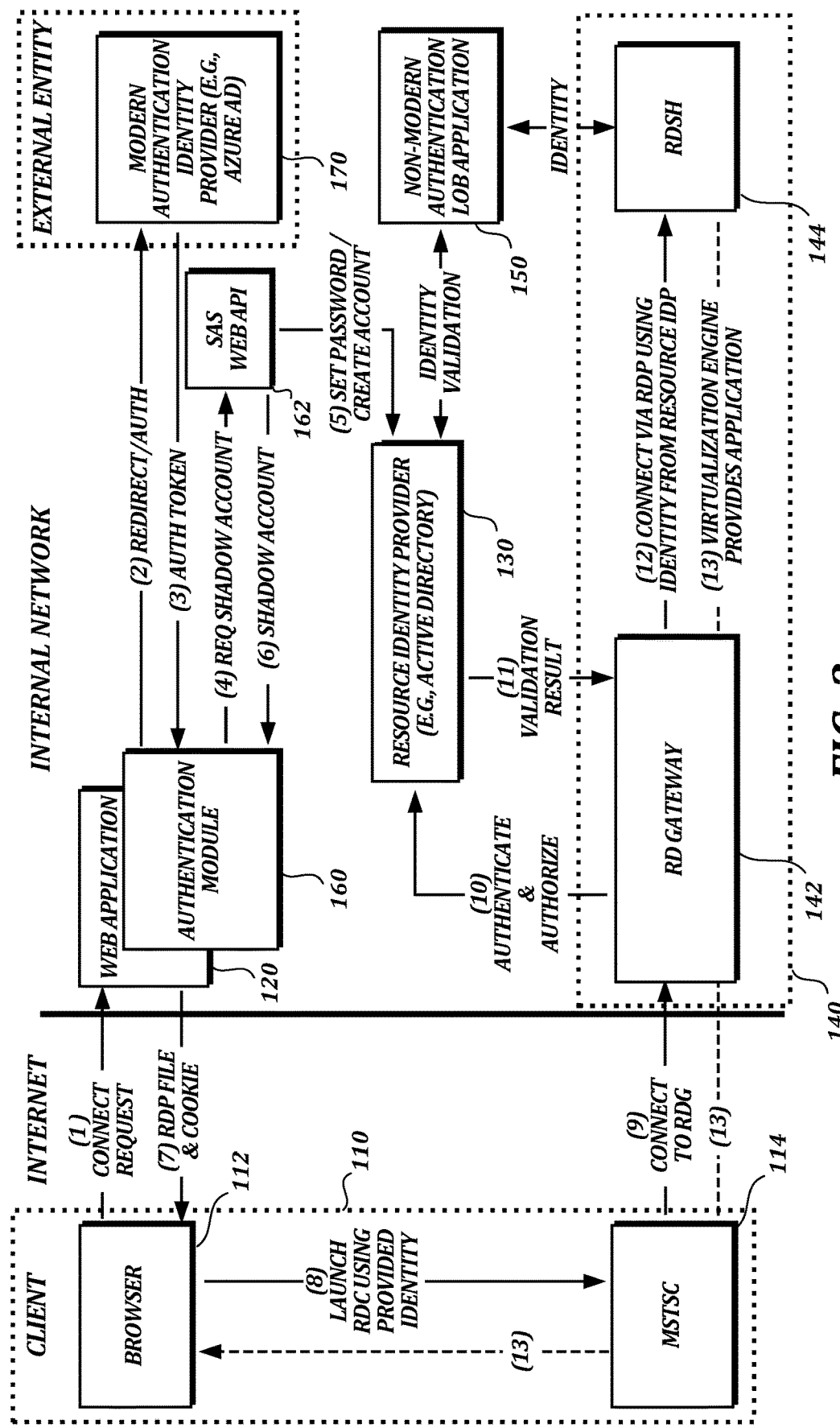
FIG. 2 is a system diagram depicting an embodiment of an authentication management system according to the present disclosure, including components and process steps that may be used to establish an authenticated connection between a client computing device and the software service of FIG. 1 using modern authentication.

FIG. 2 is a system diagram depicting components and process steps that may be used to establish an authenticated connection between a client computing device and a software service of FIG. 1 using modern authentication. The system of FIG. 2 adds components for modern authentication to the system of FIG. 1, according to an embodiment of the present disclosure. In this way, the system of FIG. 2 permits the use of modern authentication techniques, which do not require traditional credentials such as usernames and passwords, to access software services that require password-based authentication. This allows for a blended approach to authentication, permitting modern authentication for services that employ non-modern authentication techniques. Techniques depicted in FIG. 2 also can be extended to allow for multi-factor authentication, and to allow for single sign-on (SSO) functionality for cloud-based software services, such as Office 365, available from Microsoft Corporation.

In the example shown in FIG. 2, the browser 112 transmits a resource request to the web application 120 (step 1), but does not provide a username/password combination directly to the resource IdP 130. Instead, the web application 120 communicates with an authentication module 160 of an authentication management system, which redirects the resource request by transmitting an authentication request to an external authentication IdP 170 (step 2v). The authentication IdP 170 may be implemented as a cloud-based service, such as a service that uses the OAuth framework published by the Internet Engineering Task Force (IETF). In an embodiment, the external authentication IdP is an Azure AD service, available from Microsoft Corporation. The authentication IdP 170 provides modern authentication of the user, and does not require password-based authentication. The authentication IdP 170 authenticates the user and, if authentication is successful, returns an authentication token to the authentication module 160 (step 3).

Figure 3:
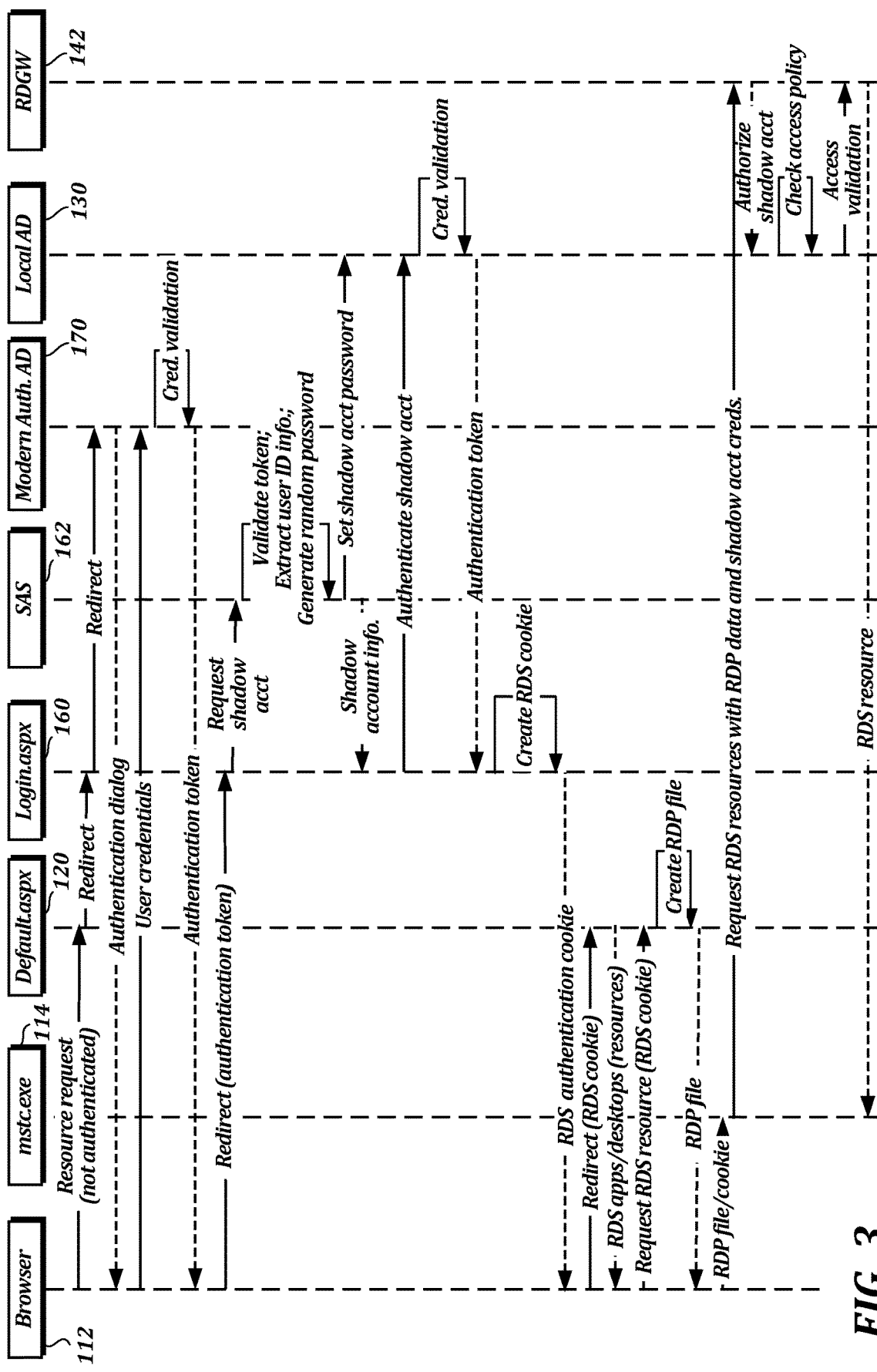
FIG. 3 is a sequence diagram that illustrates a detailed data flow that may be used in the illustrative system of FIG. 2.

FIG. 3 is a sequence diagram that illustrates a detailed data flow that may be used in the illustrative system of FIG. 2. With regard to steps 2 and 3 of FIG. 2, FIG. 3 depicts a redirected request from the authentication module 160 (e.g., login.aspx) to the authentication IdP 170 (e.g., an Azure AD service). In response to this redirected request, the authentication IdP 170 initiates an authentication dialog with the browser 112. The browser 112 provides user credentials to the authentication IdP 170, which validates those credentials and returns an authentication token to the browser 112. The user credentials may include a unique user ID that has been registered with the authentication IdP, as well as other trusted information such as a one-time password or digital certificate. The browser then redirects the authentication token to the authentication module 160.

Referring again to FIG. 2, the authentication token obtained by the authentication module 160 includes information that the system can use to eventually establish an authenticated connection with the software service 140 for the user without the user being required to provide a pre-existing password, even though the illustrative software service 140 requires password-based authentication. As noted above, this approach is useful for, among other things, applying a modern authentication approach to services that require password-based authentication, without directly modifying those services to implement a new authentication scheme.

In the example shown in FIG. 2, the authentication module 160 uses the user identity information obtained from the authentication token to request a shadow account for the software service (step 4). This may include transmitting the shadow account request to a shadow account service (SAS) 162 of the authentication management system, which communicates with the resource IdP to create an account and set a password (step 5).

FIG. 3 depicts an illustrative data flow for steps 4 and 5 of FIG. 2. In the example shown in FIG. 3, the authentication module 160 provides the authentication token to the SAS 162 in the shadow account request. The SAS 162 may proceed by validating the token, extracting user identity information from the token, and generating a random password as part of the process of creating a shadow account. The SAS 162 provides the random password to the resource IdP 130 ("local AD" in FIG. 3) during the account creation process.

Referring again to FIG. 2, once the shadow account is created, shadow account confirmation information is returned to the authentication module 160 (step 6). For additional security, an additional authentication/validation token may be required before the password of the shadow account is enabled. Thus, the shadow account confirmation information returned to the authentication module 160 may include an additional authentication token. The authentication management system then generates authenticated connection information for the software service. In an embodiment, this step is initiated when the authentication module 160 provides the shadow account confirmation information to the web application 120, which generates and provides authenticated connection information to the client computing device 110 via the browser 112 (step 7). The authenticated connection information may be provided in the form of, e.g., an authentication cookie and/or a file such as an .rdp file.

FIG. 3 depicts an illustrative data flow for steps 6 and 7 of FIG. 2. In the example shown in FIG. 3, the SAS 162 returns shadow account credentials to the authentication module 160. The authentication module 160 then authenticates the shadow account by providing the shadow account credentials to the resource IdP 130 for validation. If validation is successful, the resource IdP 130 returns an additional authentication token to the authentication module 160. The authentication module 160 creates an RDS authentication cookie and returns this cookie to the browser 112, which continues to process its original resource request by redirecting information from the RDS cookie to the web application 120. The web application 120 responds to the browser 112, creates an .rdp file, and provides this file to the browser.

Referring again to FIG. 2, the remaining steps 8-13 proceed generally as described above with reference to steps 5-10 in FIG. 1.

FIG. 3 depicts an illustrative data flow for steps 8-13 of FIG. 2. In the example shown in FIG. 3, the browser 112 provides authenticated connection information, including the .rdp file and the RDS cookie, to the client application 114 (labeled "mstc.exe" in FIG. 3). The authenticated connection information provided to the client application 114 includes shadow account credentials (e.g., in the cookie or in some other form). The client application 114 requests RDS resources by providing data from the .rdp file and shadow account credentials to the gateway 142. The gateway 142 authorizes the shadow account by sending a request to the resource IdP 130, which checks any applicable access policies to validate the request from the client application 114. The resource IdP 130 returns an appropriate response to the gateway 142. If this response indicates that access by the client application 114 is validated, the gateway 142 returns the requested RDS resource to the client application 114.

Shadow accounts may be anonymized, if the system permits, by effectively allowing new shadow accounts to be created each time a user logs in to the software service. Credentials for the shadow account also can be stored (e.g., for a particular period of time or until a particular event occurs) to allow a user to skip the login process when returning to the software service later. In this way, shadow accounts may be reused if desired. If a shadow account does not exist for particular user, a new one can be created automatically. However, the system can be extended with an approval process for new shadow accounts to prevent abuse or misuse. Shadow accounts associated with a particular user or tenant can be grouped together. To avoid old shadow accounts being misused, shadow accounts can be blocked once they are signed off or disconnected after a predetermined period of time, or after a period of inactivity is detected. In an embodiment, a browser transmits sign-out request (e.g., in response to an explicit user request, expiration of a time-out period, etc.) to the authentication management system, which ends any active sessions and blocks the previously created shadow account. For software services requiring password-based authentication, this may involve generating a new, random password and setting this password in the shadow account. The random password is not stored or provided to the client device, which effectively blocks that particular shadow account from further use. However, the system can allow the user to access the software service at a later time by performing any of the techniques described herein to create a new shadow account.

As in FIG. 1, the system of FIG. 2 depicts a remote desktop service scenario. This illustrates another potential extension of the functionality of the disclosed embodiments. As in FIG. 1, the session host 144 may be used to access an LOB application 150 that also uses non-modern (e.g., password-based) authentication. To the extent that the LOB application 150 is permitted to authenticate users by relying on the authentication process that has already been performed by the software service 140, the modern authentication extension provided by the disclosed embodiment can be effectively extended to additional applications in such a scenario.

It should be understood that the arrangements depicted in FIGS. 1 and 2 are only examples. Many extensions and alternatives to the arrangement depicted in FIG. 2 are possible.

For example, although a remote desktop service that uses password-based authentication is described, described embodiments also can be used to provide access to other software services, including software services that may use authentication techniques other than password-based authentication, such as user certificates. In such cases, described embodiments still can be employed to create shadow accounts for to provide sign-on functionality for such services, though the process of creating such shadow accounts would not necessarily require the setting of a password.

As another example, although the client computing device 110 is depicted as executing a client application 114 that communicates with a gateway 142 of the software service 140, this arrangement is not required. To illustrate this alternative, another embodiment of the present disclosure is now described with reference to FIG. 4. The embodiment of FIG. 4 similar to the embodiment described above with reference to FIGS. 2 and 3, except that the client computing device 110 may access a software service directly via the web application 120. Components such as the client application 114, gateway 142, and session host 144 may be omitted. In such a case, the browser 112 may receive authenticated connection information (e.g., in the form of a cookie), but need not transmit the authenticated connection information to a client application. Instead, the browser 112 may transmit authenticated connection information to the web application 120 to request an authenticated session (step 8). The web application 120 may provide the authenticated connection information to the authentication module 160, which transmits the authenticated connection information to the resource IdP 130 (authentication and authorization—step 9) and receives a validation result (step 10). The authentication module then sets an authenticated user context within the web application 120 (step 11) to establish the authenticated session.

Figure 4:
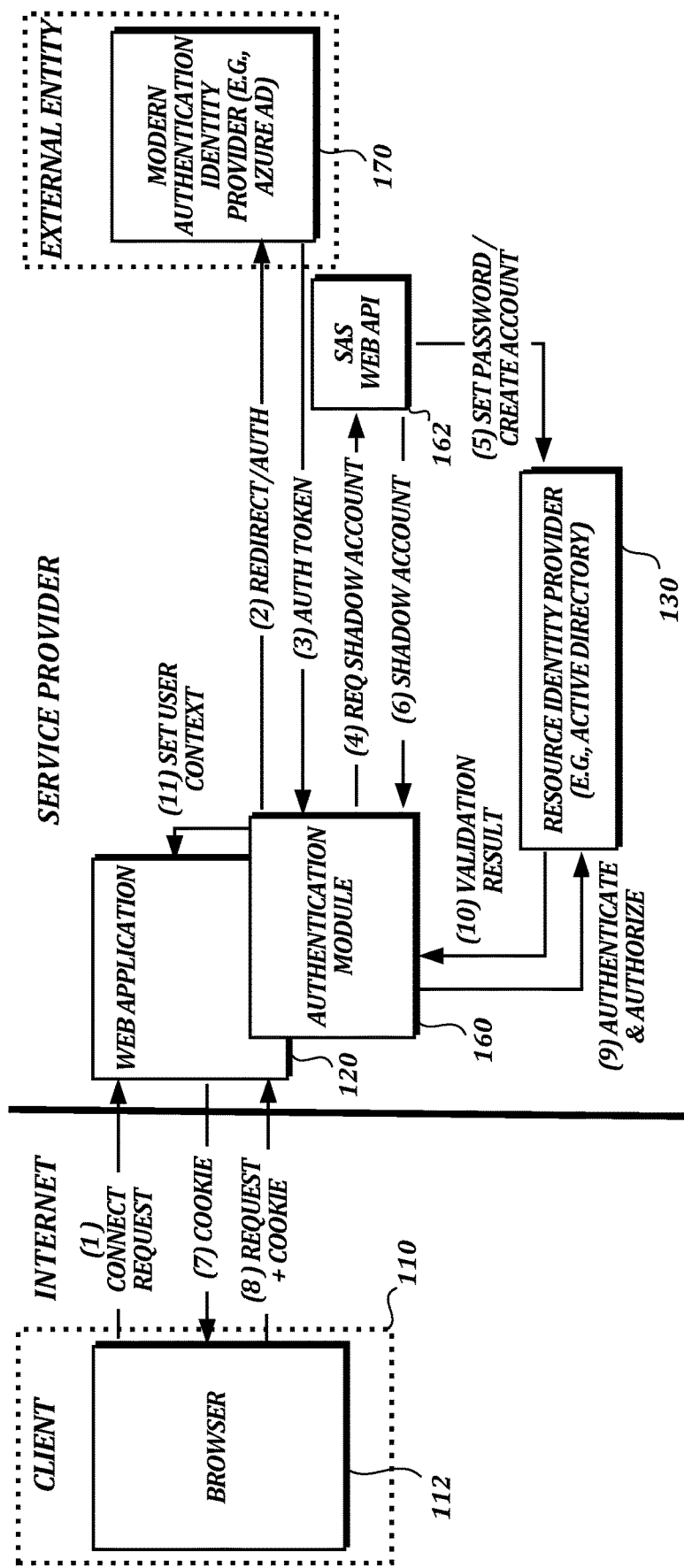
FIG. 4 is a system diagram depicting another embodiment of an authentication management system according to the present disclosure, including components and process steps that may be used to establish an authenticated connection between a client computing device and a software service using modern authentication.

As another example, although a web application 120 and an authentication module 160 are depicted separately in FIGS. 2-4, the web application 120 and the authentication module 160 need not both be present, and if both are present, they need not be implemented as separate components. In such an alternative, the functionality of the web application 120 described above may be entirely provided by the authentication module 160, or the web application 120 may include the described functionality of the authentication module 160 in addition to other functionality.

As another example, although single instances of components such as the client computing device, web application, authentication module, resource IdP, software service, and external authentication IdP are shown, it should be understood that embodiments described herein may include multiple instances of any or all of the depicted components, including multiple client computing devices, web applications, authentication modules, resource IdPs, external authentication IdPs, software services, and the like. The software services may be accessed via any suitable model such as a web application, client application, or some combination. In embodiments in which multiple software services may be accessed, the software services may employ non-modern authentication (e.g., password-based authentication), modern authentication, or some combination of authentication schemes. As described herein, embodiments of the present disclosure provide the necessary security and flexibility to provide authenticated access to any such services.

Figure 5:
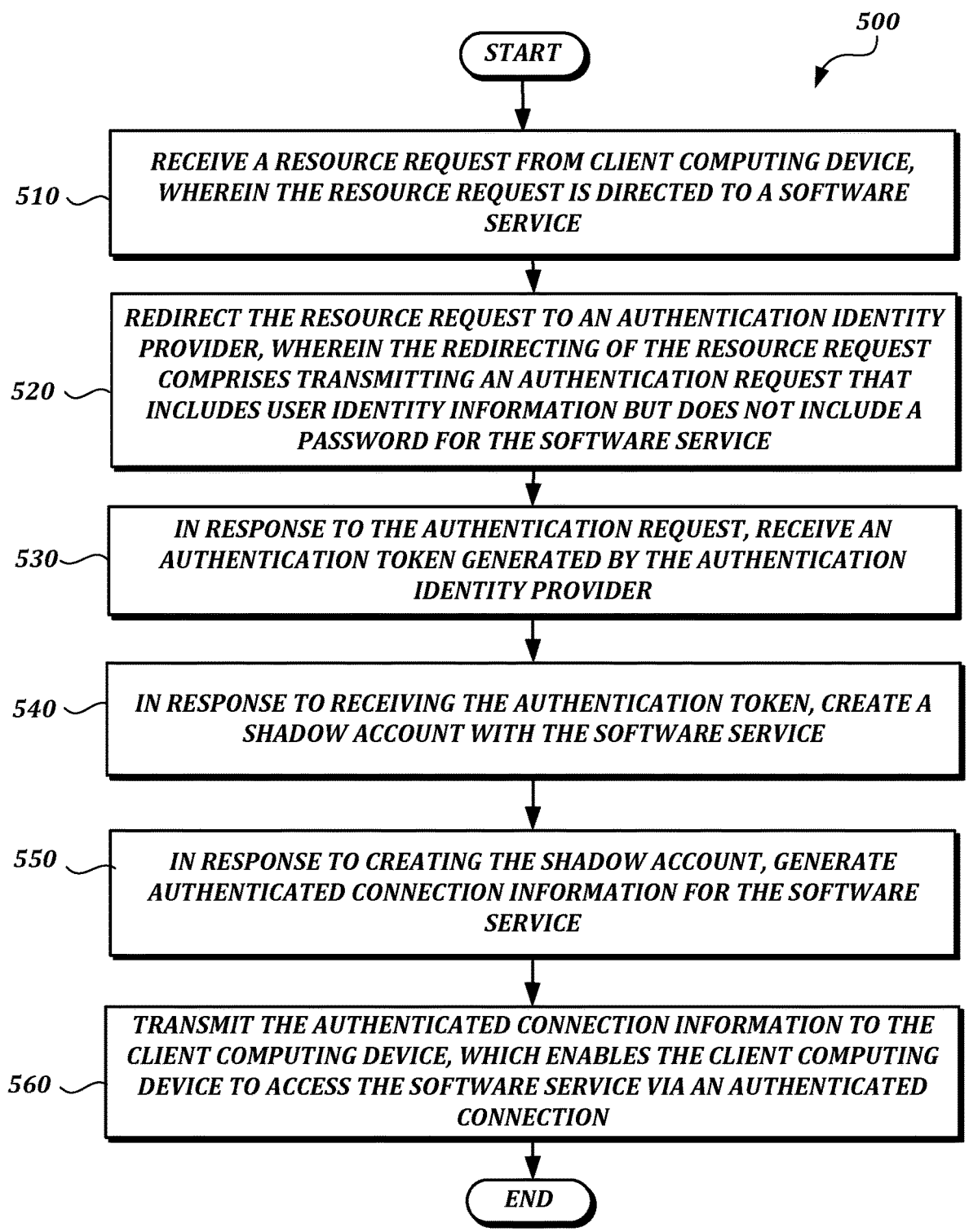
FIG. 5 is a flow chart that depicts an illustrative process that may be performed by one or more described embodiments of an authentication management system.

FIG. 5 is a flow chart that depicts an illustrative authentication management process 500 that may be performed by an authentication module in an embodiment of the authentication management system described above, or by some other component of the system, or by some other system, in accordance with aspects of the present disclosure. At step 510, the system receives a resource request from a client computing device. The resource request is directed to a software service, such as a remote desktop service, which may require password-based authentication. At step 520, the system redirects the resource request to an authentication IdP, such as Azure AD, and at step 530, the system receives an authentication token generated by the authentication IdP. The redirecting of the resource request comprises transmission of an authentication request to the authentication IdP. The authentication request includes information that allows the IdP to authenticate the user's identity (e.g., a unique user ID that was previously registered with the authentication IdP, along with other trusted information such as a one-time password or digital certificate), but it does not include a password for the software service to which the resource request is directed. In an embodiment, the authentication IdP validates user identity information, generates an authentication token if the validation is successful, and transmits the authentication token. At step 540, in response to receiving the authentication token, the system causes a shadow account to be created with the software service. If the software service requires password-based authentication, the system may set a password (e.g., a random password) for the shadow account at a resource identity provider, such as an Active Directory service. In an embodiment, the system authenticates the shadow account at the resource identity provider and, if authentication of the shadow account is successful, receives an additional authentication token from the resource identity provider. At step 550, in response to creating the shadow account, the system generates authenticated connection information (e.g., an authentication cookie) for the software service. At step 560, the system transmits the authenticated connection information to the client computing device. The authenticated connection information enables the client computing device to access the software service via an authenticated connection using methods described above with reference to FIGS. 2-4, or some other method.

Illustrative Computing Devices and Operating Environments

Unless otherwise specified in the context of specific examples, described techniques and tools may be implemented by any suitable computing device or set of devices.

Figure 6:
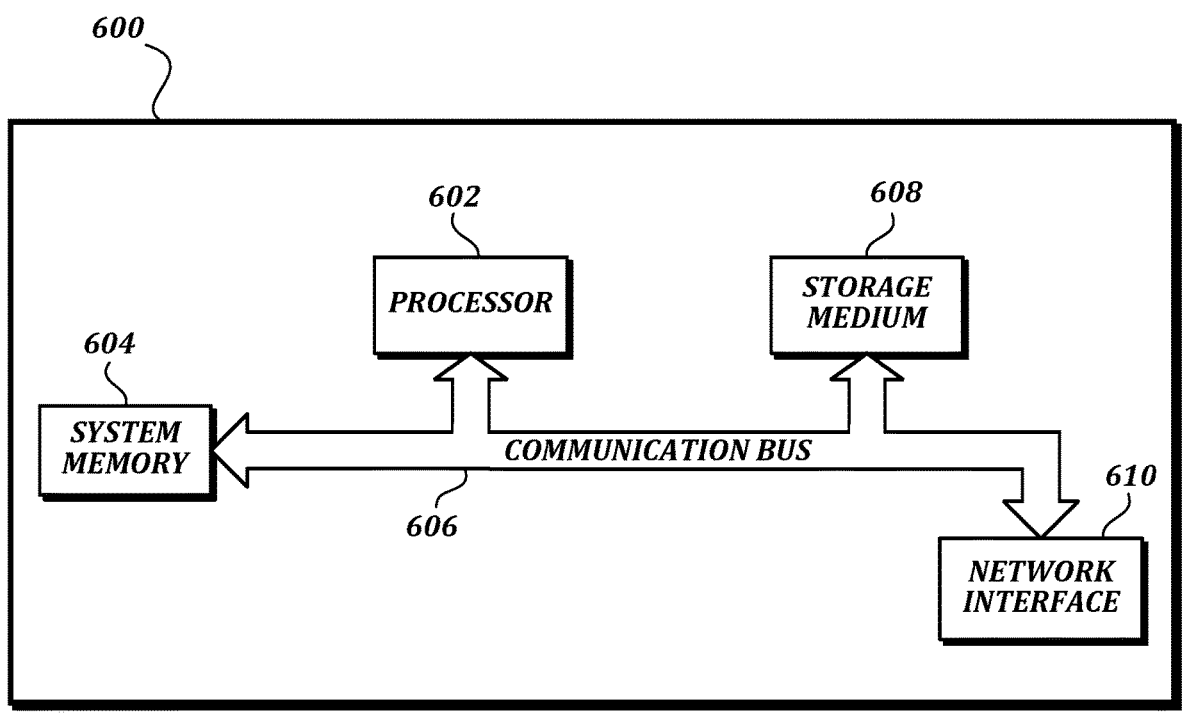
FIG. 6 is a block diagram that illustrates aspects of an illustrative computing device appropriate for use in accordance with embodiments of the present disclosure.

FIG. 6 is a block diagram that illustrates aspects of an illustrative computing device 600 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or other memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, 4G, LTE, 5G, WiMAX, Bluetooth, and/or the like.

In FIG. 6, the computing device 600 also includes a storage medium 608. However, services may be accessed using a computing device that does not include means for persisting data to a local storage medium. Therefore, the storage medium 608 depicted in FIG. 6 is optional. In any event, the storage medium 608 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 604 and storage medium 608 depicted in FIG. 6 are examples of computer-readable media.

For ease of illustration and because it is not important for an understanding of the claimed subject matter, FIG. 6 does not show some of the typical components of many computing devices. In this regard, the computing device 600 may include input devices, such as a keyboard, keypad, mouse, trackball, microphone, video camera, touchpad, touchscreen, electronic pen, stylus, and/or the like. Such input devices may be coupled to the computing device 600 by wired or wireless connections including RF, infrared, serial, parallel, Bluetooth, USB, or other suitable connection protocols using wireless or physical connections.

In any of the described examples, input data can be captured by input devices and processed, transmitted, or stored (e.g., for future processing). The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 600 (e.g., a client device), or can be integral components of the computing device 600. In some embodiments, multiple input devices may be combined into a single, multifunction input device (e.g., a video camera with an integrated microphone). The computing device 600 may also include output devices such as a display, speakers, printer, etc. The output devices may include video output devices such as a display or touchscreen. The output devices also may include audio output devices such as external speakers or earphones. The output devices can be separate from and communicatively coupled to the computing device 600, or can be integral components of the computing device 600. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location. Alternatively, a peer-to-peer arrangement, or other models, can be used.

Extensions and Alternatives

The examples described herein can be extended to include provision of additional functionality, such as digital certificates, multi-factor authentication, and encryption, any of which may be used in combination with the techniques described herein to enhance the security and reliability of the techniques described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A method performed by a computer system comprising one or more processors, a network interface, and computer-readable media, the method comprising:

receiving a resource request from a client computing device, wherein the resource request is directed to a remote desktop software service, and wherein the remote desktop software service comprises:
   a gateway configured to receive authenticated connection information and handle communication with a resource identity provider, wherein the resource identity provider comprises an active directory; and
   a session host configured to provide application functionality for the client computing device via the authenticated connection;
redirecting the resource request to an authentication identity provider, wherein the redirected resource request comprises an authentication request that includes user identity information;
in response to the authentication request, receiving an authentication token generated by the authentication identity provider;
in response to receiving the authentication token, creating a shadow account with the remote desktop software service;
in response to creating the shadow account, generating authenticated connection information for the remote desktop software service; and
transmitting the authenticated connection information to the client computing device, wherein the authenticated connection information enables the client computing device to access the remote desktop software service via an authenticated connection.

2. The method of claim 1, wherein creating the shadow account comprises creating a new account with the remote desktop software service.

3. The method of claim 1, wherein the authenticated connection information comprises a cookie.

4. The method of claim 1, wherein the step of redirecting the resource request to the authentication identity provider causes the authentication identity provider to:
   validate the user identity information;
   generate the authentication token; and
   transmit the authentication token to the computer system directly, or indirectly via the client computing device.

5. The method of claim 1 further comprising:
   authenticating the shadow account with a resource identity provider associated with the remote desktop software service; and
   if authentication of the shadow account is successful, receiving an additional authentication token from the resource identity provider.

6. The method of claim 1, wherein the resource request is received by the authentication management computer system via a web application, and wherein the authentication connection information is transmitted to the client computing device via the web application.

7. A computer system that provides authentication management services, the computer system comprising one or more processors implemented in hardware, a network interface, and non-transitory computer-readable media comprising:
   an authentication management system; and
   computer-readable instructions configured to cause the authentication management system to:
      receive a resource request from a client computing device, wherein the resource request is directed to a software service that uses password-based authentication, wherein the software service comprises:

a gateway configured to receive authenticated connection information and handle communication with a resource identity provider; and a session host configured to provide application functionality for the client computing device via the authenticated connection;

redirect the resource request to an authentication identity provider, wherein the redirected resource request comprises an authentication request that includes user identity information but does not include a password for the software service;

in response to the authentication request, receive an authentication token generated by the authentication identity provider;

in response to receiving the authentication token, create a shadow account with the software service that uses password-based authentication, wherein creating the shadow account comprises generating a random password and setting the random password as the password for the shadow account;

in response to creating the shadow account, generate authenticated connection information for the software service; and transmit the authenticated connection information to the client computing device, wherein the authenticated connection information enables the client computing device to access the software service via an authenticated connection.

8. The computer system of claim 7, wherein the computer-readable instructions are further configured to cause the authentication management system to:

set the random password as the password for the shadow account at a resource identity provider associated with the software service; and authenticate the shadow account with the resource identity provider.

9. The computer system of claim 7, wherein the software service comprises a remote desktop service.

* * * * *